United States Patent
Sugimoto (10) Patent No.: US 9,346,227 B2
(45) Date of Patent: *May 24, 2016

(54) STRIP, METHOD FOR MANUFACTURING THE SAME, AND METHOD FOR MANUFACTURING PNEUMATIC TIRE

(75) Inventor: Mutsuki Sugimoto, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 27 days.

This patent is subject to a terminal disclaimer.

(21) Appl. No.: 13/879,553

(22) PCT Filed: Jun. 17, 2011

(86) PCT No.: PCT/JP2011/063935
§ 371 (c)(1),
(2), (4) Date: Apr. 15, 2013

(87) PCT Pub. No.: WO2012/060130
PCT Pub. Date: May 10, 2012

(65) Prior Publication Data
US 2013/0192745 A1      Aug. 1, 2013

(30) Foreign Application Priority Data

Nov. 5, 2010   (JP) .................... 2010-248862
Jun. 3, 2011   (JP) .................... 2011-125168

(51) Int. Cl.
*B29D 30/20*   (2006.01)
*B29D 30/06*   (2006.01)
(Continued)

(52) U.S. Cl.
CPC .......... *B29D 30/0601* (2013.01); *B29C 47/004* (2013.01); *B29C 47/0064* (2013.01);
(Continued)

(58) Field of Classification Search
CPC .......... B29D 30/1621; B29D 30/3021; B29D 2030/0682; B60C 1/0008
USPC .................... 156/117, 193, 397; 152/510, 565
See application file for complete search history.

(56) References Cited

U.S. PATENT DOCUMENTS 2,851,729 A   9/1958  Kalkofen
3,143,155 A   8/1964  Knox
(Continued)

FOREIGN PATENT DOCUMENTS

EP   0 206 756 A2   12/1986
EP   0 397 081 A2   11/1990
(Continued)

OTHER PUBLICATIONS

Machine generated English language translation of JP 06-107896 (original document dated Apr. 1994).*
(Continued)

*Primary Examiner* — Martin Rogers
(74) *Attorney, Agent, or Firm* — Birch, Stewart, Kolasch & Birch, LLP

(57) ABSTRACT

A strip of a thermoplastic elastomer to be wound spirally on a cylindrical drum for forming an inner liner for a tire having a shape close to a finished sectional shape is provided. The strip is formed of composite layers of (A) a first layer made of a styrene-isobutylene-styrene triblock copolymer and (B) a second layer containing at least one of a styrene-isoprene-styrene triblock copolymer and a styrene-isobutylene diblock copolymer. The strip further has a strip main body and ear portions arranged on opposite sides thereof. The strip main body has a thickness (T1) of 0.05 mm to 1.0 mm. The ear portions have a thickness (T2) thinner than the thickness (T1) of the strip main body and a width (W2) of 0.5 mm to 5.0 mm. This ribbon-shaped strip reduces unevenness of the surface of a sheet formed by the opposite ends of the strip when manufacturing an inner liner.

5 Claims, 6 Drawing Sheets

(51) Int. Cl.
  *B29D 30/30* (2006.01)
  *B60C 1/00* (2006.01)
  *B60C 5/14* (2006.01)
  *C08L 53/02* (2006.01)
  *B29C 47/00* (2006.01)
  *B29K 21/00* (2006.01)

(52) U.S. Cl.
  CPC .......... *B29D30/3028* (2013.01); *B60C 1/0008* (2013.04); *B60C 5/14* (2013.01); *C08L 53/02* (2013.01); *B29C 47/003* (2013.01); *B29C 47/0019* (2013.01); *B29C 47/0021* (2013.01); *B29D 2030/0682* (2013.01); *B29D 2030/3078* (2013.01); *B29K 2021/003* (2013.01); *B60C 2005/145* (2013.04); *B60C 2005/147* (2013.04); *C08L 2205/02* (2013.01)

(56) References Cited

U.S. PATENT DOCUMENTS

| | | | |
|---|---|---|---|
| 3,414,036 A | 12/1968 | Skidmore | |
| 4,387,175 A * | 6/1983 | Bohm et al. | 524/68 |
| 4,946,899 A | 8/1990 | Kennedy et al. | |
| 5,219,948 A | 6/1993 | Storey et al. | |
| 5,851,323 A | 12/1998 | Kaido et al. | |
| 5,992,486 A | 11/1999 | Katsuki et al. | |
| 6,331,591 B1 * | 12/2001 | Miyamoto | C08L 23/22 525/70 |
| 6,576,077 B1 * | 6/2003 | Mitsuhashi et al. | 156/117 |
| 7,347,239 B2 | 3/2008 | Yukawa et al. | |
| 7,681,613 B2 | 3/2010 | Yukawa et al. | |
| 8,616,255 B2 | 12/2013 | Sugimoto | |
| 8,893,756 B2 | 11/2014 | Sugimoto et al. | |
| 2006/0042737 A1 | 3/2006 | Hayashi et al. | |
| 2006/0096696 A1 | 5/2006 | Oku et al. | |
| 2007/0144658 A1 | 6/2007 | Miki et al. | |
| 2008/0020203 A1* | 1/2008 | Tabata | 428/343 |
| 2008/0249236 A1 | 10/2008 | Nakashima et al. | |
| 2008/0314492 A1* | 12/2008 | Tsou et al. | 152/510 |
| 2008/0314505 A1* | 12/2008 | Nishitani | 156/123 |
| 2009/0165914 A1 | 7/2009 | Tomoi | |
| 2009/0229738 A1* | 9/2009 | Lo Presti et al. | 156/117 |
| 2010/0012242 A1* | 1/2010 | Kudo et al. | 152/152.1 |
| 2010/0126646 A1 | 5/2010 | Kudo et al. | |
| 2010/0126647 A1 | 5/2010 | Hashimura et al. | |
| 2010/0175804 A1* | 7/2010 | Lesage et al. | 152/511 |
| 2010/0263778 A1 | 10/2010 | Lesage et al. | |
| 2010/0294411 A1 | 11/2010 | Custodero et al. | |
| 2010/0331473 A1* | 12/2010 | Miyazaki | 524/449 |
| 2011/0000603 A1 | 1/2011 | Hashimura et al. | |
| 2011/0011511 A1 | 1/2011 | Miyazaki et al. | |
| 2011/0056604 A1 | 3/2011 | Sugimoto | |
| 2011/0120612 A1 | 5/2011 | Nemoto | |
| 2012/0003413 A1* | 1/2012 | Lesage et al. | 428/36.6 |
| 2013/0199687 A1 | 8/2013 | Sugimoto | |

FOREIGN PATENT DOCUMENTS

| | | | |
|---|---|---|---|
| EP | 1 798 075 A2 | 6/2007 | |
| JP | 35-5479 | 3/1960 | |
| JP | 62-048704 A | 3/1987 | |
| JP | 64-062308 A | 3/1989 | |
| JP | 3-174403 A | 7/1991 | |
| JP | 06-107896 * | 4/1994 | C08L 53/00 |
| JP | 6-143288 A | 5/1994 | |
| JP | 9-019987 A | 1/1997 | |
| JP | 11-254446 A | 9/1999 | |
| JP | 2000-079643 A | 3/2000 | |
| JP | 2000-254980 A | 9/2000 | |
| JP | 2000-317940 A | 11/2000 | |
| JP | 2005-280260 A | 10/2005 | |
| JP | 2006-062196 A | 3/2006 | |
| JP | 2006-297733 A | 11/2006 | |
| JP | 2007-83656 A | 4/2007 | |
| JP | 2007-176088 A | 7/2007 | |
| JP | 2007-296916 A | 11/2007 | |
| JP | 2008-12751 A | 1/2008 | |
| JP | 2008-126509 A | 6/2008 | |
| JP | 2008-127443 A | 6/2008 | |
| JP | 2009-000990 A | 1/2009 | |
| JP | 2009-513436 A | 4/2009 | |
| JP | 2009-143169 A | 7/2009 | |
| JP | 2009-149711 A | 7/2009 | |
| JP | 2009-220460 A | 10/2009 | |
| JP | 2010-058437 A | 3/2010 | |
| JP | 2010-100082 A | 5/2010 | |
| JP | 2010-100675 A | 5/2010 | |
| JP | 2010-527839 A | 8/2010 | |
| JP | 2010-528919 A | 8/2010 | |
| JP | 2010-532801 A | 10/2010 | |
| JP | 2011-51320 A | 3/2011 | |
| WO | WO 2005/033035 A1 | 4/2005 | |
| WO | WO 2006/046354 A1 | 5/2006 | |
| WO | WO 2007/013161 A1 | 2/2007 | |
| WO | WO 2007/050061 A1 | 5/2007 | |
| WO | WO 2007/126143 A1 | 11/2007 | |
| WO | WO 2008/029779 A1 | 3/2008 | |
| WO | WO 2008/029781 A1 | 3/2008 | |
| WO | WO 2008/145276 * | 12/2008 | B60C 5/14 |
| WO | WO 2009/007064 A1 | 1/2009 | |
| WO | WO 2009/044652 * | 4/2009 | C08L 23/22 |
| WO | WO 2009/119232 A1 | 10/2009 | |
| WO | WO 2010/063427 * | 6/2010 | B32B 25/08 |
| WO | WO 2010/143094 A1 | 12/2010 | |

OTHER PUBLICATIONS

The Adhesion Between Polymers H. R. Brown Annu. Rev. Mater. Sci. 1991; pp. 463-489.*
International Search Report for PCT/JP2011/063935 dated Sep. 13, 2011.
Office Action issued in Japanese Application 2011-125168 mailed May 8, 2012.
Office Action issued in Japanese Application 2011-125168 mailed Oct. 23, 2012.
Office Action issued in Japanese Application 2011-125168 mailed Sep. 6, 2011.
English machine translation of JP 2000-317940 A, Nov. 21, 2000.
English machine translation of JP 2007-83656 A, Apr. 5, 2007.
Extended European Search Report issued May 28, 2015, in European Patent Application No. 11819650.0.
International Search Report issued Aug. 30, 2011, in PCT International Application No. PCT/JP2011/062489.
Notice of Grounds of Rejection mailed Aug. 23, 2011, in Japanese Patent Application No. 2010-270473, with English translation.
Notice of Grounds of Rejection mailed Aug. 23, 2011, in Japanese Patent Application No. 2010-188568, with English translation.

* cited by examiner

STRIP, METHOD FOR MANUFACTURING THE SAME, AND METHOD FOR MANUFACTURING PNEUMATIC TIRE

TECHNICAL FIELD

The present invention relates to a strip for an inner liner used for a pneumatic tire, a method for manufacturing the strip, and a method for manufacturing a pneumatic tire including the strip.

BACKGROUND ART

In recent years, in response to strong social demands for low fuel consumption of vehicles, weight reduction of tires has been sought. Among tire members, weight reduction and the like of an inner liner also have begun. The inner liner is disposed inwardly in a tire, and has a function of reducing an amount of leakage of air from inside to outside of the pneumatic tire.

Currently, a rubber composition for such an inner liner employs, for example, a rubber blend mainly containing a butyl rubber. The rubber blend contains the butyl rubber by 70 mass % to 100 mass %, and a natural rubber by 30 mass % to 0 mass %. In this way, the tire is provided with improved air permeability resistance. In addition to butylene, the rubber blend mainly containing the butyl rubber contains isoprene by approximately 1 mass %, which acts with sulfur, vulcanization accelerator, and zinc white to achieve cross-linking between rubber molecules. In the case of normal blend, the above-described butyl-based rubber needs to have a thickness of 0.6 mm to 1.0 mm for a tire of a passenger car, and needs to have a thickness of approximately 1.0 mm to 2.0 mm for a tire of a truck/bus. In order to achieve weight reduction of such tires, use of polymer, which is more excellent in air permeability resistance than the butyl-based rubber and can provide an inner liner layer with a thinner thickness, has been requested.

Conventionally, in order to achieve weight reduction of a tire, it has been proposed to use a film made of a material including thermoplastic resin, instead of the above-described rubber composition. However, when a tire is manufactured using an inner liner of thin thermoplastic resin, the inner liner partially becomes too thin due to pressure in a vulcanization step, with the result that the finishing gauge of the inner liner in the resulting tire product becomes thinner than the designed gauge. In the thin portion of the inner liner thus finished, a phenomenon (open thread) in which a carcass cord looks to stand out takes place, thus giving a user an impression of bad inner appearance. In addition, when the inner liner is thin, gas barrier property becomes partially bad to decrease tire internal pressure, with the result that the tire may burst in the worst case.

Meanwhile, during traveling with the tire, large shear strain acts on a vicinity of a shoulder portion in the inner liner. When the material including the thermoplastic resin is used as the inner liner, this shear strain is likely to cause detachment at an adhesion interface between the inner liner and the carcass ply, with the result that air leakage takes place from the tire, disadvantageously.

In Patent Literature 1 (International Publication WO2008/029781), a tire is manufactured using a strip of film layer stack in which thermoplastic resin and thermoplastic elastomer are blended. With the film layer stack, gas barrier property and adhesive property can be improved, whereby bonding can be achieved between the ribbon-shaped strips. However, in this technique, gauge is constant in a non-vulcanized raw cover of film layer stack. Hence, when the gauge is thinned, a buttress portion or the like in the finished tire after vulcanization may become thin.

Patent Literature 2 (Japanese Patent Laying-Open No. 2009-220460) discloses a method for manufacturing an inner liner material by extrusion molding a thermoplastic elastomer composition in which a thermoplastic resin constitutes a sea component and a rubber constitutes an island component into a sheet shape through an extrusion mouthpiece, wherein the extrusion mouthpiece has a mouthpiece slit having a thick extrusion portion in cross section between the central part of the slit and each of opposite ends of the slit and has a ratio (%) of thickness increment $\Delta t$ with respect to length $\Delta 1$ of a thickness changing portion in the slit longitudinal direction is set at 0.01 to 10%. With this structure, it is intended to obtain characteristics of enhanced effect of preventing air leakage and of unlikeliness to peel off.

However, the size of the extrusion die is difficult to change, which imposes limits on the size of tires to be manufactured. Even if several types of extrusion dies are prepared, it will take time for stage changing at the time of size changing, which decreases productivity.

Patent Literature 3 (Japanese Patent Laying-Open No. 2000-254980) discloses sequentially winding a ribbon-shaped unvulcanized rubber strip on a cylindrical drum, thereby forming a rubber component into a contour close to a desired finished sectional shape.

Conventionally, an inner liner used for a pneumatic tire is obtained in general by continuously extrusion molding into a predetermined finished sectional shape from a rubber extruder or the like. The finished sectional shape is determined by a mouthpiece provided at a head part of the rubber extruder. In the conventional method for extrusion molding into a finished sectional shape, the sectional size of a rubber component is large, so that a large size rubber extruder needs to be used. As a result, a production line cannot be reduced in size. Moreover, to solve problems of deteriorated productivity in small quantity, large variety production and the like, various types of mouthpieces should be prepared depending on the types of tire and the like, and besides, exchanging and adjusting operations of the mouthpiece and the like are required every time the type of tire to be manufactured is changed.

However, when forming a tire component by a ribbon-shaped rubber strip, workability is disadvantageous due to tackiness between rubber compositions and the rubber component formed of the rubber strip deforms disadvantageously during storage.

Patent Literature 4 (Japanese Patent Laying-Open No. 2010-058437) discloses a method for molding a sheet by extruding melted resin into a sheet shape from a die, holding the extruded resin sheet between a die roller and a nip roller, at least one of which has a projecting shape formed thereon, to transfer the projecting shape to the sheet, forming a cut groove therein, and cooling and hardening.

Patent Literature 5 (Japanese Patent Laying-Open No. 9-19987) discloses a layer stack for improving adhesive property between an inner liner layer and a rubber layer. By providing adhesion layers on the opposite sides of the inner liner layer, the adhesion layers come into contact with each other at an overlapping portion of the inner liner layer and are bonded firmly by heating. Air pressure retainability is thus improved. However, these adhesion layers for overlapping in the inner liner layer will come into contact with a bladder in a heated state in a vulcanization step and will be stuck to the bladder disadvantageously.

CITATION LIST

Patent Literature

PTL 1: International Publication WO2008/029781
PTL 2: Japanese Patent Laying-Open No. 2009-220460
PTL 3: Japanese Patent Laying-Open No. 2000-254980
PTL 4: Japanese Patent Laying-Open No. 2010-058437
PTL 5: Japanese Patent Laying-Open No. 9-19987

SUMMARY OF INVENTION

Technical Problem

The present invention provides a ribbon-shaped strip used for an inner liner and a method of manufacturing the strip. In general, a strip has a flat rectangular cross sectional shape. Therefore, when overlapping a ribbon-shaped strip of predetermined width to make a wider sheet, overlapping portions on the opposite ends of the strip becomes thick, so that the surface of a finished sheet has unevenness. Therefore, a first object of the present invention is to equalize the thickness of an inner liner by providing ear portions for the ribbon-shaped strip.

A second object of the present invention is to reduce rolling resistance by weight reduction through the use of a thermoplastic elastomer strip and further to prevent the inner liner from breaking or deforming by heat and pressure of a bladder in a vulcanization step, thereby avoiding cracks in the surface and/or air remaining inside.

A third object of the present invention is to improve adhesive property between the inner liner and a carcass ply through the use of the thermoplastic elastomer strip and to reduce crack growth in connection with repeated flection deformation during traveling with the tire.

Solution to Problem

The present invention is a strip of a thermoplastic elastomer to be wound spirally on a cylindrical drum to form an inner liner for a tire having a shape close to a finished sectional shape. The strip is formed of composite layers of (A) a first layer made of a styrene-isobutylene-styrene triblock copolymer and (B) a second layer containing at least one of a styrene-isoprene-styrene triblock copolymer and a styrene-isobutylene diblock copolymer. The strip further has a strip main body and ear portions arranged on opposite sides thereof. The strip main body has a thickness (T1) of 0.05 mm to 1.0 mm. The ear portions have a thickness (T2) thinner than the thickness (T1) of the strip main body and a width (W2) of 0.5 mm to 5.0 mm.

The strip preferably has a width (W0) of 5 mm to 40 mm. The ear portions of the strip preferably have a thickness of 0.02 mm to 0.5 mm. The first layer has a thickness of 0.05 mm to 0.6 mm, and the second layer is preferably adjusted to have a thickness of 0.01 mm to 0.3 mm.

The present invention relates to a method for manufacturing the strip made of a thermoplastic elastomer, including the steps of (a) extruding the thermoplastic elastomer by an extruder having an extruder main body and an extrusion head to form a sheet having a horizontally long rectangular cross sectional shape, (b) passing the sheet through a pair of die rollers and transferring a shape of the die rollers on the sheet to form the strip having the ear portions on ends thereof, and (c) detaching the strip from the die rollers.

Furthermore, another aspect of the present invention relates to a method for manufacturing a pneumatic tire, characterized in that the strip is wound spirally on the cylindrical drum to form the inner liner, and the inner liner is disposed on an inner surface of a raw tire, and then vulcanization is performed.

Advantageous Effects of Invention

According to the present invention, a ribbon-shaped strip of a thermoplastic-elastomer material having ear portions on the opposite ends is used for an inner liner. An unvulcanized raw cover adjusted in thickness depending on the arrangement position in a tire can thus be designed. For example, merely a buttress portion can be designed to be thick, which can improve gas barrier property and tire durability. Moreover, because the strip is of ribbon shape, it is applicable to tires of any tire size. Particularly because of the use of a layer stack of thermoplastic elastomers, the overall thickness can be made thin to achieve weight reduction while maintaining air shutoff property, so that rolling resistance can be reduced. Furthermore, adhesive property with an adjacent carcass ply can be improved, so that flection crack growth can be reduced.

BRIEF DESCRIPTION OF DRAWINGS

Each of FIG. 8(a) to FIG. 8(d) is a schematic cross sectional view showing an arrangement of an inner liner.

DESCRIPTION OF EMBODIMENTS

<Structure of Tire>

The present invention relates to a method for manufacturing a pneumatic tire including an inner liner disposed inwardly in the tire. The inner liner is manufactured by spirally winding a ribbon-shaped strip on a cylindrical drum. The ribbon-shaped strip has ear portions on the opposite ends thereof. Here, the ribbon-shaped strip is manufactured by extrusion molding into a state close to a finished sectional shape.

The strip is formed of the polymer layer stack of at least two layers. The first layer is made of a styrene-isobutylene-styrene triblock copolymer (SIBS), and has a thickness ranging from 0.05 mm to 0.6 mm. The second layer contains at least one of a styrene-isoprene-styrene triblock copolymer (SIS) and a styrene-isobutylene diblock copolymer (SIB), and has a thickness of 0.01 mm to 0.3 mm. The second layer is arranged to be in contact with a rubber layer of a carcass ply.

Figure 1:
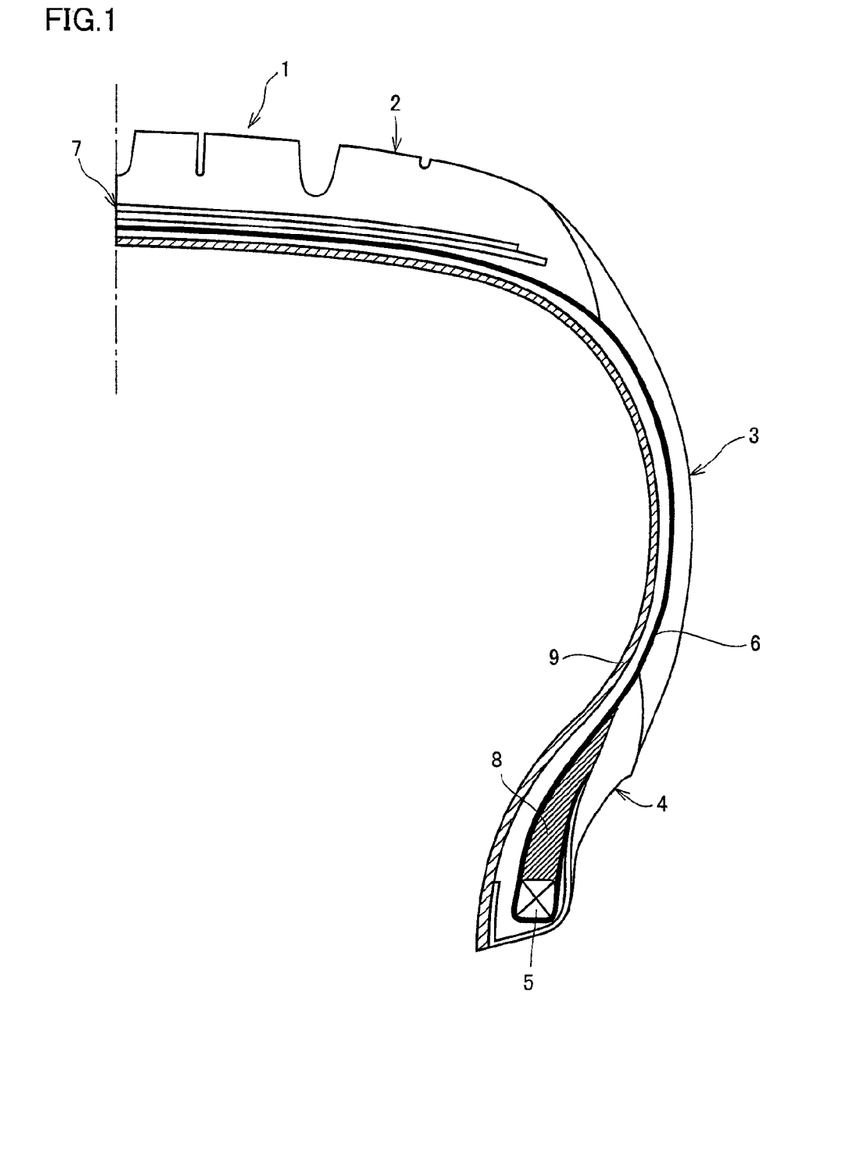
FIG. 1 is a schematic cross sectional view of the right half of a pneumatic tire of the present invention.

An embodiment of a pneumatic tire manufactured by the present invention will be described based on the drawings. FIG. 1 is a schematic cross sectional view of the right half of the pneumatic tire. In the figure, pneumatic tire 1 includes a tread portion 2, and a sidewall portion 3 and bead portions 4 so as to form a shape of toroid from the opposite ends of the tread portion. In each of bead portions 4, a bead core 5 is embedded. Further, a carcass ply 6 and a belt layer 7 are disposed. Carcass ply 6 is provided to extend from one bead portion 4 to the other bead portion, and is anchored by winding its ends around bead cores 5. Belt layer 7, which is formed of at least two plies, is disposed outside a crown portion of carcass ply 6.

Belt layer 7 is disposed such that two plies, which are formed of cords such as steel cords or aramid fibers, are arranged to allow the cords to cross each other between the plies normally at an angle of 5° to 30° relative to the tire circumferential direction. It should be noted that topping rubber layers can be provided on the outer sides of the ends of the belt layer to reduce detachment in the ends of the belt layer. Further, in the carcass ply, organic fiber cords such as polyester, nylon, or aramid are arranged at substantially 90° relative to the tire circumferential direction. In a region surrounded by the carcass ply and its turning portion, a bead apex 8 is disposed to extend from the upper end of bead core 5 in the sidewall direction. Further, an inner liner 9 is disposed inwardly relative to carcass ply 6 in the direction of the tire radius, so as to extend from one bead portion 4 to the other bead portion 4.

<Shape of Strip>

Figure 4:
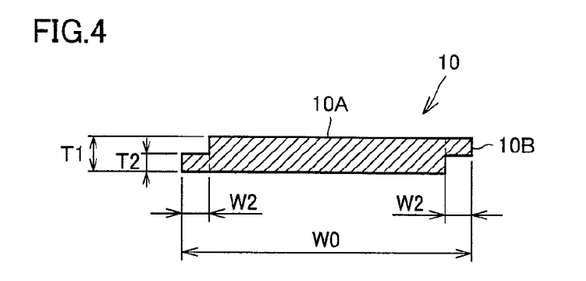
FIG. 4 is a schematic cross sectional view of a strip of the present invention.
Figure 5:
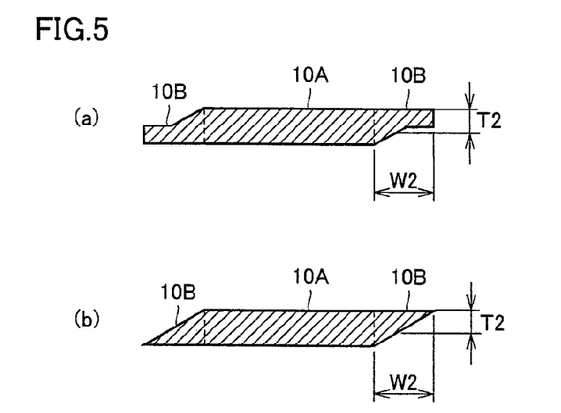
FIG. 5 is a schematic cross sectional view of strips of the present invention.
Figure 6:
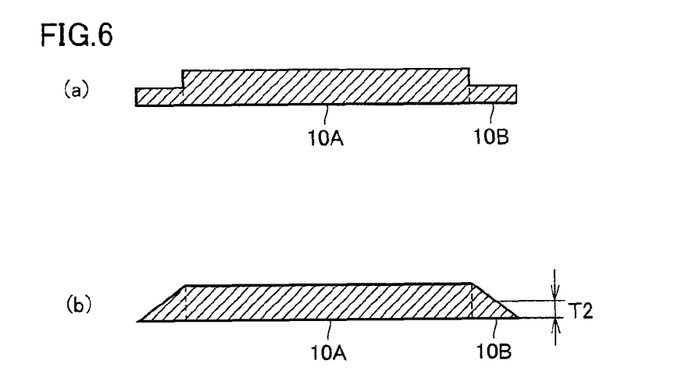
FIG. 6 is a schematic cross sectional view of strips of the present invention.

Each of FIGS. 4 to 6 shows a cross sectional view of an embodiment of a strip 10. Strip 10 is configured such that a strip main body 10A has a thickness (T1) of 0.05 mm to 1.0 mm and ear portions 10B formed on the opposite sides of strip main body 10A have a thickness (T2) thinner than the thickness (T1) of the strip main body. Ear portions 10B preferably have a width (W2) of 0.5 mm to 5.0 mm so as to smooth out unevenness that would be formed on the surface wound on a drum. The strip has an overall width (W0) adjusted to range from 5 mm to 40 mm, and preferably ranges from 10 to 30 mm.

In the present invention, the thickness (T1) of strip main body 10A needs to be in a range of 0.05 mm to 1.0 mm. If the thickness is less than 0.05 mm, extrusion molding will be difficult, and the number of times will be increased unnecessarily in order to form an inner liner of predetermined thickness. On the other hand, if the thickness exceeds 1.0 mm, flection durability of the inner liner will be decreased and weight reduction can no longer be expected. The thickness (T1) of the strip preferably ranges from 0.1 mm to 0.5 mm.

The thickness (T2) of ear portions 10B, made thinner than the thickness (T1) of the strip main body, ranges from 0.02 mm to 0.5 mm, and more preferably ranges from 0.05 mm to 0.2 mm. If the thickness (T2) of the ear portions is thinner than 0.02 mm, extrusion dimensional accuracy may be deteriorated. On the other hand, if the thickness (T2) of the ear portions is thicker than 0.5 mm, unevenness of the surface formed by adjacent portions of the strip may be increased. Here, the thickness (T2) of the ear portions is defined as an average thickness in the widthwise direction when it is changed in the widthwise direction of the strip.

Moreover, the width (W2) of ear portions 10B is preferably adjusted to range from 0.8 mm to 3.0 mm, and the value of (W2×2) is preferably not more than the value of (W0×0.5).

If width W2 of the ear portions falls outside the range of 0.5 mm to 5.0 mm, the thickness dimension of the cross section of the inner liner formed by bonding the strip may become uneven.

Here, although ear portions 10B of the strip are preferably symmetric on the right and left ends of the strip main body, they can be asymmetric. For example, in FIG. 4, the ear portion on the left end is formed with a constant thickness on the lower surface, and the ear portion on the right end is formed with a constant thickness on the upper surface. With such a shape, the ear portions of the strip adjacent to each other when winding the strip on the drum to form the inner liner reduce a step difference formed at the strip ends, enabling less uneven bonding. It should be noted that strip main body 10A has its thickness (T1) forming a horizontally-long, flat rectangular shape constant in the longitudinal direction.

FIG. 5(a) shows a structure in which ear portions 10B of the strip partially have inclined sections. FIG. 5(b) shows an example in which ear portions 10B of the strip are formed only by inclined sections. It should be noted that, with the strip of the present invention, the ear portions of the strip adjacent to each other when winding the strip on the drum to form the inner liner can reduce a step difference at the strip ends.

FIG. 6(a) shows ear portions 10B formed by forming steps on the right and left ends of strip main body 10A, ear portions 10B being made thinner. Ear portions 10B have a constant thickness on the lower surface of the strip. In this case, when bonding the strip on the drum, a step difference will be formed at ends of adjacent portions of the strip, but the unevenness can be reduced. FIG. 6(b) shows ear portions 10B gradually decreasing in thickness toward the lower surface of the strip at the right and left ends of strip main body 10A. In this case, when bonding the strip on the drum, a step difference will also be formed at ends of adjacent portions of the strip, but an inner liner sheet having less uneven surface shape can be obtained.

By forming the strip of the present invention into the above-described shape, adjacent ear portions of the strip fit together appropriately when winding the strip on the drum to form an inner liner, so that a junction of even thickness can be formed. It should be noted that the thickness (T1) of strip main body 10A forms a horizontally long, flat rectangular shape constant in the longitudinal direction. It should be noted that not only these shapes but also various variations can be employed for the ear portions of the present invention.

<Method for Manufacturing Strip>

Figure 2:
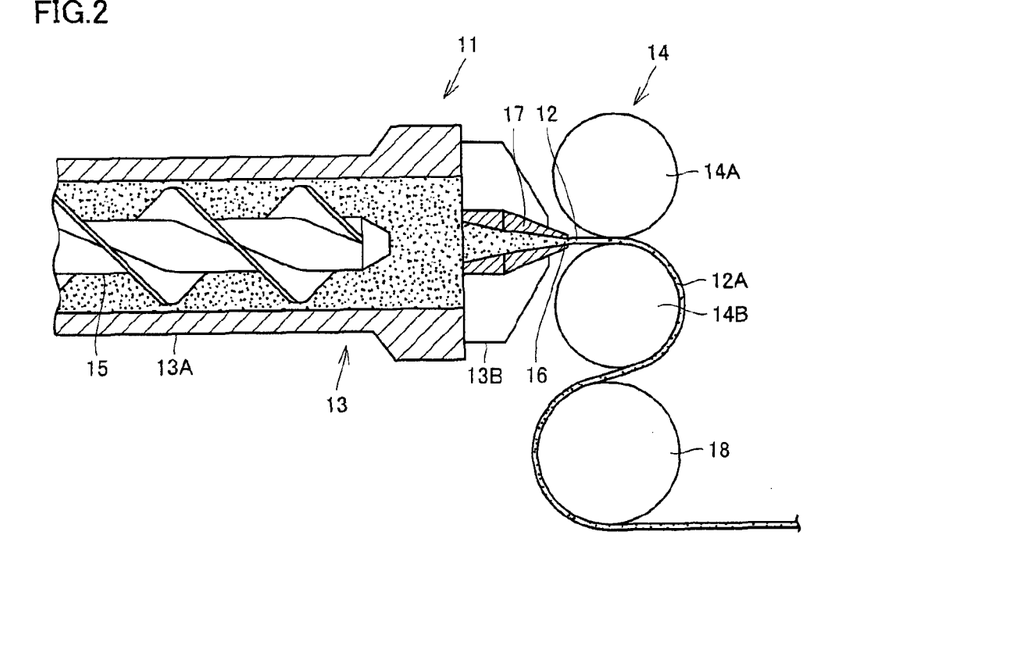
FIG. 2 is a schematic view of a device manufacturing a strip of the present invention.

A method for manufacturing strip 10 will be described with reference to FIG. 2. A strip manufacturing device 11 is composed of an extruder 13 for extrusion molding of a thermoplastic elastomer sheet 12 having a horizontally-long rectangular cross section and a pair of die rollers 14 arranged in the vicinity of an extrusion port 16.

Extruder 13 includes an extruder main body 13A having a screw shaft 15 and an extrusion head 13B forming a sheet of thermoplastic elastomer discharged from this extruder main body 13A to extrude the sheet through extrusion port 16. Extruder main body 13A kneads and melts the input thermoplastic elastomer with screw shaft 15 driven by a motor having a slowdown function.

Extrusion head 13B has a mouthpiece 17 for extrusion molding attached to the leading end of extruder main body 13A to constitute extrusion port 16.

The pair of die rollers 14 has a structure having upper and lower rolls 14A, 14B, and is held in the transverse direction orthogonal to the direction of extrusion through extrusion port 16. Upper and lower die rolls 14A, 14B are rotatably drive controlled at the same speed and in synchronization with each other.

Figure 3:
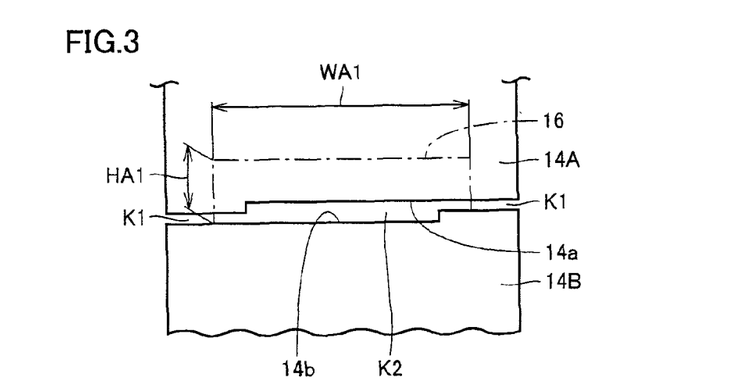
FIG. 3 is a cross sectional view showing the distance between a die roll and a nip roll in the manufacturing device shown in FIG. 2.

In addition, a gap between upper and lower die rolls 14A, 14B presents a shape resembling the sectional shape of strip 10, as shown in FIG. 3. Here, "resembling" refers to being substantially similar to the sectional shape of strip 10. The similarity proportion is usually in a range of 0.50 to 0.90 in consideration of expansion, and a gap K is smaller.

That is, one or both of upper and lower die rolls 14A, 14B are provided with recessed sections 14a, 14b on the circumferential surface of a straight cylindrical roll body. Recessed sections 14a, 14b correspond to strip main body 10A. Therefore, ear portions 10B are molded by gaps K1 between die rolls 14A, 14B, and strip main body 10A is molded by a gap K2 formed by recessed sections 14a, 14b.

In this way, in manufacturing device 11, horizontally-long rectangular sheet 12 is formed first by extruder 13, and the shape of the die roll is transferred to the sheet on the condition that heat is not generated during die roll molding. Then, strip 12A with the ear portions is detached from die roller 14B by a free roller 18, and is processed into a final shape. Accordingly, dimensional accuracy and stability are increased, and manufacturing efficiency can be improved in that, for example, a knife cutting operation for width adjustment usually required in calender molding becomes unnecessary. Besides, variations in thickness T2 of ear portions 10B can be reduced, so that strip 10 of high quality can be manufactured.

It should be noted that, for that purpose, it is preferable to set an opening height HA1 of extrusion port 16 of extrusion head 13B at 2 to 7 times thickness T1 of the strip and to set an opening width WA1 of extrusion port 16 at 0.7 to 1.0 times width W0 of the strip.

If opening height HA1 exceeds 7 times T1 and opening width WA1 is less than 0.7 times W0, the processing ratio in die roll molding will be excessively large, resulting in degraded quality and accuracy of strip 10. Particularly, accuracy in width will become unstable, which will require width accuracy to be maintained by knife cutting. If opening height HA1 is less than twice T1, the sheet thickness at the time of extrusion will be thin in order to obtain strip 10 of not more than 1.0 mm. Then, extrusion pressure will be higher, resulting in unstable dimensions. On the other hand, if opening width WA1 exceeds W0, the processing ratio will become too small to the contrary to cause strip 10 to break, and dimensional stability will be deteriorated.

It should be noted that it is desirable to perform mold release processing on the die rolls and the free roll to be used in the molding step and the detaching step. Examples of a conventional technique that can be adopted for the mold release processing include a method for subjecting the roll surface to nitriding (radical nitriding, Kanuc process) to obtain a Cr—N coating (hardness Hv: 200 to 800; thickness: 25 to 500 μm), plating obtained by impregnating hard chromium with Teflon® (hardness Hv: 800 to 1000; thickness: 25 to 1000 μm), a diamond-like carbon (DLC) coating (hardness Hv: 2000 to 7000; thickness: 0.2 to 3.0 μm), and a Teflon® coating (hardness Hv: 100 to 500; thickness: 0.1 to 0.5 μm).

<Polymer Layer Stack>

In the present invention, the inner liner is manufactured by winding a ribbon-shaped strip on the drum, and the strip is implemented by a polymer layer stack. Here, the polymer layer stack includes a first layer made of a styrene-isobutylene-styrene triblock copolymer (SIBS) and a second layer containing at least one of a styrene-isoprene-styrene triblock copolymer (SIS) and a styrene-isobutylene diblock copolymer (SIB).

The first layer has a thickness of 0.05 mm to 0.6 mm. The second layer is adjusted to have a thickness not more than 0.4 mm, preferably 0.01 mm to 0.3 mm. The polymer layer stack is adjusted to have an overall thickness in a range of 0.05 mm to 1.0 mm, preferably in a range of 0.06 mm to 0.9 mm.

By forming the strip with the ear portions by this polymer layer stack to manufacture an inner liner, surface unevenness can be reduced and made smooth. This can solve the conventional problems, such as remaining air due to great unevenness.

<First Layer>

The first layer is made of the styrene-isobutylene-styrene triblock copolymer (SIBS). An isobutylene block in the SIBS provides a polymer film made of the SIBS with excellent air permeability resistance. Therefore, when the polymer made of the SIBS is used for the inner liner, a pneumatic tire excellent in air permeability resistance can be obtained.

Further, the molecular structure of the SIBS is completely saturated except aromatic side chain, so that the SIBS is restrained from being deteriorated and hardened and therefore has excellent durability. Therefore, when a polymer film made of the SIBS is used for the inner liner, a pneumatic tire with excellent durability can be obtained.

When manufacturing a pneumatic tire by applying such a polymer film made of the SIBS to the inner liner, air permeability resistance can be secured. Therefore, it is not necessary to use a halogenated rubber, such as a halogenated butyl rubber, having been conventionally used to provide air permeability resistance and having a high specific gravity. Even if it is used, an amount of usage thereof can be reduced. Accordingly, weight reduction of tire can be achieved, thus achieving the effect of improving fuel efficiency.

The molecular weight of the SIBS is not particularly limited, but the SIBS preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be unfavorably decreased. On the other hand, when the weight average molecular weight thereof exceeds 400,000, extrusion workability unfavorably becomes bad. In order to further improve air permeability resistance and durability, the SIBS contains the styrene component at a content of 10 mass % to 30 mass %, preferably, 14 mass % to 23 mass %.

In the copolymer of the SIBS, the isobutylene block preferably has a degree of polymerization in a range of approximately 10,000 to 150,000, and the styrene block preferably has a degree of polymerization in a range of approximately 5,000 to 30,000, in view of rubber elasticity and handling (when the degree of polymerization is less than 10,000, each block will be in a liquid form).

The SIBS can be obtained through a general living cationic polymerization method for a vinyl-based compound. For example, each of Japanese Patent Laying-Open No. 62-48704 and Japanese Patent Laying-Open No. 64-62308 discloses that living cationic polymerization is possible between isobutylene and another vinyl compound and use of isobutylene and another compound for a vinyl compound allows for production of a polyisobutylene-based block copolymer.

The SIBS does not have a double bond other than an aromatic side chain in the molecule. Hence, the SIBS is stable to ultraviolet rays as compared with a polymer having a double bond in molecule, such as polybutadiene. Accordingly, the SIBS is excellent in weather resistance. Further, even though the SIBS does not have a double bond in the molecule and is a saturated rubbery polymer, the SIBS has a refractive index (nD) of 1.506 for light having a wavelength of 589 nm at 20° C., as indicated by Polymer Handbook, Willy, 1989. This is significantly higher than that of another saturated rubbery polymer, such as ethylene-butene copolymer.

The first layer made of such an SIBS has a thickness T1 of 0.05 mm to 0.6 mm. If the thickness of the first layer is less than 0.05 mm, the first layer may be broken due to pressing pressure when vulcanizing the raw tire in which the polymer layer stack is applied to the inner liner, with the result that an air leakage phenomenon may take place in the resulting tire. On the other hand, if the thickness of the first layer exceeds 0.6 mm, the weight of the tire is increased to result in decreased performance in fuel efficiency. Further, the first layer preferably has a thickness of 0.05 mm to 0.4 mm. The first layer can be obtained by forming the SIBS into the form of a film by means of a general method for forming thermoplastic resin or thermoplastic elastomer into a film, such as extrusion molding or calender molding.

<Second Layer>

The second layer contains at least one of the SIS layer made of a styrene-isoprene-styrene triblock copolymer (hereinafter, also referred to as "SIS") and the SIB layer made of a styrene-isobutylene diblock copolymer (hereinafter, also referred to as "SIB").

The isoprene block of the styrene-isoprene-styrene triblock copolymer (SIS) is a soft segment. Hence, a polymer film made of the SIS is likely to adhere to a rubber component through vulcanization. Therefore, when a polymer film made of the SIS is used for the inner liner, a pneumatic tire excellent in durability can be obtained because the inner liner is excellent in adhesive property with the rubber layer of the carcass ply, for example.

The molecular weight of the SIS is not particularly limited, but the SIS preferably has a weight average molecular weight of 100,000 to 290,000 measured through GPC measurement, in view of rubber elasticity and moldability. When the weight average molecular weight thereof is less than 100,000, tensile strength may be unfavorably decreased. On the other hand, when the weight average molecular weight thereof exceeds 290,000, extrusion workability unfavorably becomes bad. The SIS preferably contains the styrene component at a content of 10 mass % to 30 mass % in view of tackiness, adhesive property, and rubber elasticity.

In the present invention, it is preferable that in the SIS, the isoprene block has a degree of polymerization in a range of approximately 500 to 5,000 and the styrene block has a degree of polymerization in a range of approximately 50 to 1,500 in view of rubber elasticity and handling.

The SIS can be obtained through a general polymerization method for a vinyl-based compound, such as the living cationic polymerization method. The SIS layer can be obtained by forming the SIS into the form of a film by means of a general method for forming thermoplastic resin or thermoplastic elastomer into a film, such as extrusion molding or calender molding.

The isobutylene block of the styrene-isobutylene diblock copolymer (SIB) is a soft segment. Hence, a polymer film made of the SIB is likely to adhere to a rubber component through vulcanization. Therefore, when a polymer film made of the SIB is used for the inner liner, a pneumatic tire excellent in durability can be obtained because the inner liner is excellent in adhesive property with an adjacent rubber forming the carcass or an insulation, for example.

For the SIB, a linear SIB is preferably used in view of rubber elasticity and adhesive property. The molecular weight of the SIB is not particularly limited, but the SIB preferably has a weight average molecular weight of 40,000 to 120,000 measured through GPC measurement, in view of rubber elasticity and moldability. When the weight average molecular weight thereof is less than 40,000, tensile strength may be unfavorably decreased. On the other hand, when the weight average molecular weight thereof exceeds 120,000, extrusion workability unfavorably becomes bad.

The SIB preferably contains the styrene component at a content of 10 mass % to 35 mass %, in view of tackiness, adhesive property, and rubber elasticity.

In the present invention, it is preferable that in the SIB, the isobutylene block has a degree of polymerization in a range of approximately 300 to 3,000 and the styrene block has a degree of polymerization in a range of approximately 10 to 1,500 in view of rubber elasticity and handling.

The SIB can be obtained through a general polymerization method for a vinyl-based compound, such as the living cationic polymerization method. For example, WO2005/033035 discloses a manufacturing method wherein the SIB is obtained by adding methylcyclohexane, n-butyl chloride, and cumyl chloride into an agitator, cooling them to −70° C., reacting them for 2 hours, then adding a large amount of methanol to stop the reaction, and performing vacuum-drying at 60° C.

The SIB layer can be obtained by forming the SIB into the form of a film through a general method for forming thermoplastic resin or thermoplastic elastomer into a film, such as extrusion molding or calender molding.

Thickness T2 of the second layer is not more than 0.4 mm, and preferably ranges from 0.01 mm to 0.3 mm. Here, the thickness of the second layer refers to the thickness of the SIS layer if the second layer is composed only of the SIS layer, refers to the thickness of the SIB layer if the second layer is composed only of the SIB layer, and refers to the total thickness of the SIS layer and the SIB layer if the second layer is composed of two layers of the SIS layer and the SIB layer. If the thickness of the second layer is less than 0.01 mm, the second layer may be broken due to pressing pressure when vulcanizing the raw tire in which the polymer layer stack is applied to the inner liner, with the result that vulcanization adhesion strength may be decreased. On the other hand, if the thickness of the second layer exceeds 0.4 mm, the weight of the tire is increased to result in decreased performance in fuel efficiency. Further, the second layer preferably has a thickness of 0.01 mm to 0.3 mm.

<Manufacturing of Inner Liner>

Figure 9:
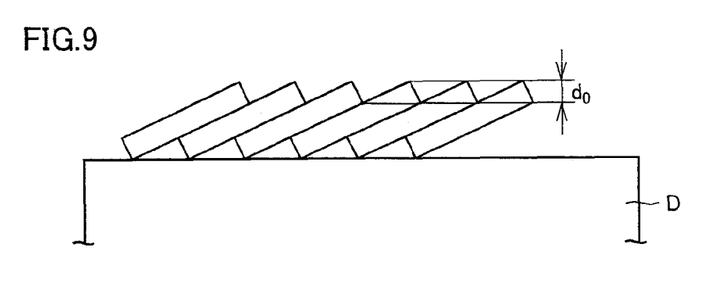
FIG. 9 is a schematic view showing a method for manufacturing an inner liner using a conventional strip.

The strip of the present invention is formed by winding ribbon-shaped strip 10. As shown in FIG. 7(a), strip 10 is sequentially wound spirally on a cylindrical drum D, and adjacent portions of strip 10 form overlapping portions to form an inner liner. Here, adjacent portions of strip 10 form a step difference during winding as shown in FIG. 7(b) with their ends shown on an enlarged scale, but the ear portions will reduce an uneven step difference d. On the other hand, as shown in FIG. 9, an uneven step difference d0 formed in the case of using a conventional strip of rectangular cross section having no ear portions is about twice the unevenness in the case of the strip having the ear portions.

In this way, the use of the strip having the ear portions facilitates making the inner liner resemble a finished sectional shape required of the inner liner. In addition, a smooth contour can be obtained, and surface cracks can be prevented from occurring after vulcanization. On the other hand, the inner liner can be formed by approximately the same number of times of winding as in the case of a conventional strip of the same thickness, which can restrain production efficiency from being deteriorated and air from remaining.

<Method for Manufacturing Pneumatic Tire>

The pneumatic tire of the present invention can be manufactured using a general manufacturing method. Polymer layer stack PL is used to manufacture a strip. Then, the above-described method is used to manufacture the inner liner. Pneumatic tire 1 can be manufactured by applying the above-described inner liner to the raw tire of pneumatic tire 1 and vulcanizing and molding them together with other members. When disposing polymer layer stack PL on the raw tire, the second layer of polymer layer stack PL, i.e., an SIS layer PL2 or an SIB layer PL3 is disposed outwardly in the direction of the tire radius in contact with carcass ply 61. With this arrangement, in the tire vulcanization step, adhesive strength can be increased between carcass ply 61 and SIS layer PL2 or SIB layer PL3. In the resulting pneumatic tire, the inner liner and the rubber layer of carcass ply 61 are adhered to each other in an excellent manner. Thus, the pneumatic tire can have excellent air permeability resistance and durability.

<Arrangement of Inner Liner>

Figure 8:
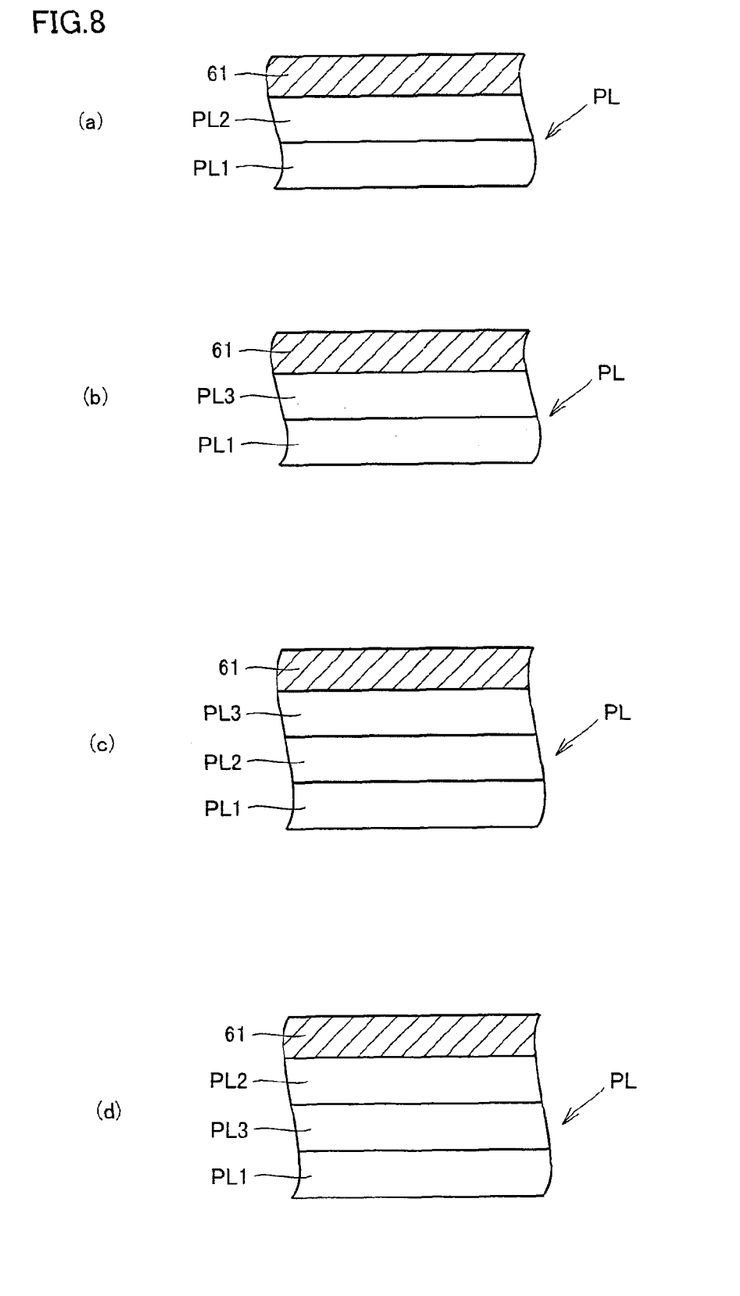

FIG. 8 shows an arrangement of the inner liner formed of the polymer layer stack in the vulcanized tire of the present invention. In FIG. 8(a), a polymer layer stack PL is formed of an SIBS layer PL1 serving as the first layer, and SIS layer PL2 serving as the second layer. When applying polymer layer stack PL to the inner liner of the pneumatic tire and disposing SIS layer PL2 outwardly in direction of the tire radius so as to bring SIS layer PL2 into contact with carcass ply 61, adhesive strength between SIS layer PL2 and carcass ply 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 8(b), polymer layer stack PL is formed of SIBS layer PL1 serving as the first layer, and SIB layer PL3 serving as the second layer. When applying polymer layer stack PL to the inner liner of the pneumatic tire and disposing a surface of SIB layer PL3 outwardly in direction of the tire radius so as to bring the surface of SIB layer PL3 into contact with carcass ply 61, adhesive strength between SIB layer PL3 and carcass ply 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 8(c), polymer layer stack PL is formed of SIBS layer PL1 serving as the first layer, SIS layer PL2 and SIB layer PL3 both serving as the second layer. SIBS layer PL1, SIS layer PL2, and SIB layer PL3 are stacked on one another in this order. When applying polymer layer stack PL to the inner liner of the pneumatic tire and disposing a surface of SIB layer PL3 outwardly in direction of the tire radius so as to bring the surface of SIB layer PL3 into contact with carcass ply 61, adhesive strength between SIB layer PL3 and carcass ply 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 8(d), polymer layer stack PL is formed of SIBS layer PL1 serving as the first layer, and SIB layer PL3 and SIS layer PL2 both serving as the second layer. SIBS layer PL1, SIB layer PL3, and SIS layer PL2 are stacked on one another in this order. When applying polymer layer stack PL to the inner liner of the pneumatic tire and disposing a surface of SIS layer PL2 outwardly in direction of the tire radius so as to bring the surface of SIS layer PL2 into contact with carcass ply 61, adhesive strength between SIS layer PL2 and carcass ply 61 can be increased in the step of vulcanizing the tire. Accordingly, the inner liner and the rubber layer of carcass ply 61 are adhered to each other in an excellent manner. Thus, the pneumatic tire can have excellent air permeability resistance and durability.

EXAMPLES

<Material of Strip>

The following thermoplastic elastomers (SIB, SIBS, and SIS) were used for manufacturing of the strip of the present invention.

SIB

Into a 2 L reaction container having an agitator, 589 mL of methylcyclohexane (dried with molecular sieves), 613 ml of n-butyl chloride (dried with molecular sieves), and 0.550 g of cumyl chloride were added. The reaction container was cooled to −70° C., and then 0.35 mL of α-picoline (2-methylpyridine) and 179 mL of isobutylene were added. Further, 9.4 mL of titanium tetrachloride was added to start polymerization. They were reacted with each other for 2.0 hours while stirring the solution at −70° C. Next, 59 mL of styrene was added to the reaction container, and reaction was continued for another 60 minutes. Thereafter, a large amount of methanol was added to stop the reaction. After removing a solvent and the like from the reaction solution, the polymer was dissolved with toluene and rinsed twice. This toluene solution was added to a methanol mixture to precipitate a polymer. The polymer thus obtained was dried at 60° C. for 24 hours, thereby obtaining a styrene-isobutylene diblock copolymer.

The content of the styrene component: 15 mass %

Weight average molecular weight: 70,000

SIBS

"SIBSTAR 102 (Shore A hardness: 25; the content of the styrene component: 25 mass %; weight average molecular weight: 100,000)" provided by Kaneka Corporation was used.

SIS

D1161JP (the content of the styrene component: 15 mass %; weight average molecular weight: 150,000) provided by Kraton Polymers was used.

<Method for Manufacturing Inner Liner>

Commercially available pellets were used for the above-described SIBS and SIS, and the SIB obtained by the above-described manufacturing method was used. They were mixed by the following formulation. This mixture was extruded into a ribbon-shaped sheet (thickness: 0.3 mm) at a screw speed of 80 RPM and an extrusion rate of about 9 m/min using an extruder shown in FIGS. 2 and 3 (screw diameter: φ80 mm; L/D: 50; die gap width: 40 mm; cylinder temperature: 220° C.).

This sheet was passed through die rolls 14A, 14B to manufacture strip 12A with the ear portions of predetermined shape formed on the opposite ends. It should be noted that ribbon-shaped sheet 12 has a multilayer structure obtained by coextruding thermoplastic elastomers of the first layer and the second layer using the above-mentioned extruder. Then, the strip was passed by a free roller 18 and detached from the die rollers to obtain strip 12A having a sectional structure shown in FIG. 4. Here, strip 10 has width W0 of 20 mm and thickness T1 of 3 mm. Ear portions 10B have width W2 of 0.3 mm and thickness T2 of 0.02 mm.

Figure 7:
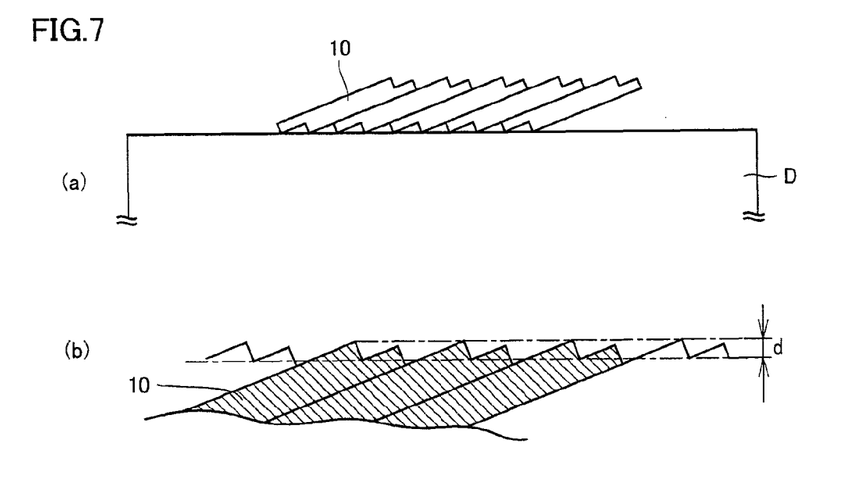
FIG. 7 is a schematic view showing a method for manufacturing an inner liner using the strip of the present invention.

The above-described strip was wound on the drum shown in FIG. 7 and molded into a wide sheet with adjacent ear portions of the strip forming junctions together to manufacture a 0.3-mm-thick sheet for inner liner.

Formulation of Strip

| | |
|---|---|
| Thermoplastic elastomer (Note 1) | 100 parts by mass |
| Stearic acid (Note 2) | 3 parts by mass |
| Zinc oxide (Note 3) | 5 parts by mass |

-continued

| | |
|---|---|
| Antioxidant (Note 4) | 1 part by mass |
| Vulcanization accelerator (Note 5) | 1 part by mass |
| Sulfur (Note 6) | 0.5 part by mass |

(Note 1) SIBS, SIS, and SIB were used for thermoplastic elastomers.
(Note 2) Stearic acid: "Stearic Acid LUNAC S30" provided by Kao Corp.
(Note 3) Zinc oxide: "Zinc White No. 1" provided by Mitsui Mining and Smelting Co., Ltd.
(Note 4) Antioxidant: "NOCRAC 6C" (N-(1,3-dimethylbutyl)-N'-phenyl-p-phenylenediamine) provided by Ouchi Shinko Chemical
(Note 5) Vulcanization accelerator: "NOCCELER DM" (di-2-benzothiazolyldisulfide) provided by Ouchi Shinko Chemical
(Note 6) Sulfur: "Sulfur Powder" provided by TSURUMI CHEMICAL INDUSTRIES CO. LTD.

<Manufacturing of Tire>

A pneumatic tire of tire size of 195/65R15 was prototyped using an inner liner obtained by molding a strip based on the specifications shown in Table 1 on a drum. It should be noted that press vulcanization was performed for 20 minutes at 170° C. Then, the tire was cooled for 3 minutes at 100° C. without removing the tire from the vulcanization mold, and then was removed from the vulcanization mold.

It should be noted that the Examples were strips provided with ear portions, and the Comparative Example was a strip having no ear portions.

TABLE 1

| | | Comparative Example 1 | Example 1 | Example 2 | Example 3 | Example 4 |
|---|---|---|---|---|---|---|
| Strip | Shape | Rectangular | FIG. 6(a) | FIG. 5(b) | FIG. 4 | FIG. 6(b) |
| | Width (W0) (mm) | 20 | 20 | 40 | 40 | 10 |
| | Thickness (T1) (mm) | 0.3 | 0.3 | 0.6 | 1.0 | 0.05 |
| | Width of Ear Portion (W2) (mm) | — | 3.0 | 5.0 | 5.0 | 0.5 |
| | Thickness of Ear Portion (T2) (mm) | — | 0.02 | 0.3 | 0.5 | 0.02 |
| Layer Stack | First Layer: SIBS | SIBS | SIBS | SIBS | SIBS | SIBS |
| | Thickness (mm) | 0.25 | 0.25 | 0.4 | 0.6 | 0.04 |
| | Second Layer: SIS | SIS | SIS | SIS | SIS | SIS |
| | Thickness (mm) | 0.05 | 0.05 | 0.1 | 0.2 | 0.01 |
| | Second Layer: SIB | — | — | SIB | SIB | — |
| | Thickness (mm) | | | 0.1 | 0.2 | |
| Tire Performance | Air-in | C | A | A | A | A |
| | Flection Crack Growth | C (88 cracks) | A (0 crack) | A | A | A |
| | Rolling Resistance Index | 100 | 103 | 104 | 102 | 105 |
| | Static Air Pressure Decrease | 2.7%/M | 1.8%/M | 1.7%/M | 1.5%/M | 1.8%/M |

<Method for Evaluating Tire Performance>

For the pneumatic tires of the Examples and the Comparative Example shown in Table 1, performance evaluation was conducted by the following methods.

<Air-In Performance>

The inside of a vulcanized tire was checked by appearance and evaluated as follows:

A: In appearance, per tire, the number of air bubbles with a diameter not more than 5 mm was 0, and the number of air bubbles with a diameter exceeding 5 mm was 0.

B: In appearance, per tire, the number of air bubbles with a diameter not more than 5 mm was 1 to 3, and the number of air bubbles with a diameter exceeding 5 mm was 0.

C: In appearance, per tire, the number of air bubbles with a diameter not more than 5 mm was 4 or more, and the number of air bubbles with a diameter exceeding 5 mm was 1 or more.

<Flection Crack Growth Test>

In endurance traveling test, evaluation was made depending on whether the inner liner was cracked or detached. Each trial tire was assembled to a JIS specification rim 15×6 JJ. The tire internal pressure was set at 150 KPa, which was lower internal pressure than normal internal pressure. The load was set at 600 kg. The speed was set at 100 km/h. The travel distance was set at 20,000 km. Inside of the tire was observed to measure the number of cracks and detachments. Evaluation was made on a determination criterion that a tire with 50 or more cracks was rated C, a tire with 1 to 49 cracks was rated B, and a tire with 0 crack was rated A.

<Rolling Resistance Index>

Each trial tire was assembled to a JIS specification rim 15×6 JJ, and a rolling resistance tester provided by Kobe Steel Ltd was used to measure rolling resistance thereof while performing traveling at a room temperature (30° C.) under conditions of a load of 3.4 kN, an air pressure of 230 kPa, and a speed of 80 km/h. Based on the below-described formula, the rolling resistance change ratio (%) of each Example was expressed in an index with Comparative Example 1 being 100 as a reference. As the rolling resistance change ratio is larger, the rolling resistance is further reduced.

Rolling Resistance Index=(Rolling Resistance of Comparative Example 1/Rolling Resistance of Example)×100

<Static Air Pressure Decreasing Ratio Test>

Each trial tire was assembled to a JIS specification rim 15×6 JJ, and air was introduced thereinto at an initial air pressure of 300 kPa. Then, the trial tire was left for 90 days at a room temperature. Then, decreasing ratio of air pressure was calculated after one month. As the numerical value thereof is smaller, the air pressure is less decreased, which is preferable.

<Tire Evaluation Results>

Comparative Example 1 is an example strip having no ear portions. Examples 1 and 4 are strips having the cross sectional shape shown in FIG. 6(a). Example 2 is a strip having the cross sectional shape shown in FIG. 5(b). Example 3 is a strip having the cross sectional shape shown in FIG. 4. The evaluation results of Table 1 reveal that the Examples of the present invention are more excellent than Comparative Example 1 in the results of air-in, flection crack growth test, rolling resistance index, and static air pressure decreasing ratio test.

INDUSTRIAL APPLICABILITY

The pneumatic tire of the present invention can be used as a pneumatic tire for track/bus, a pneumatic tire for heavy vehicle, or the like, besides a pneumatic tire for passenger car.

REFERENCE SIGNS LIST

1: pneumatic tire; 2: tread portion; 3: sidewall portion; 4: bead portion; 5: bead core; 6: carcass ply; 7: belt layer; 8: bead apex; 9: inner liner; 10: strip; 11: strip manufacturing device; 12: sheet; 13: extruder; 14A, 14B: die roller; 15: screw shaft; 16: extrusion port; 17: mouthpiece; 18: free roller; PL: polymer layer stack; PL1: SIBS layer; PL2: SIS layer; PL3: SIB layer.

The invention claimed is:

1. A method for manufacturing a pneumatic tire in which a strip is wound spirally on a cylindrical drum such that a strip main body forms overlapping portions to form an inner liner, and the inner liner is disposed on an inner surface of a raw tire, and then vulcanization is performed, wherein
   said strip is formed of composite layers of
   (A) a first layer consisting essentially of a styrene-isobutylene-styrene (SIBS) triblock copolymer and
   (B) a second layer comprising:
      (b1) a layer made of a styrene-isoprene-styrene (SIS) triblock copolymer; and
      (b2) a layer consisting essentially of a styrene-isobutylene (SIB) diblock copolymer, stearic acid, zinc oxide, antioxidant, vulcanization accelerator, and sulfur, and disposed adjacently to the carcass ply,
   said SIB having the isobutylene block having a degree of polymerization in a range of 300 to 3,000 and the styrene block having a degree of polymerization in a range of 10 to 1,500,
   said strip further having ear portions on opposite sides of the strip main body,
   said strip main body having a thickness of 0.05 mm to 1.0 mm, and
   said ear portions having a thickness thinner than the thickness of said strip main body and a width of 0.5 mm to 5.0 mm.

2. The method for manufacturing a pneumatic tire according to claim 1, wherein said strip has a width of 5 mm to 40 mm.

3. The method for manufacturing a pneumatic tire according to claim 1, wherein said ear portions of said strip have a thickness of 0.02 mm to 0.5 mm.

4. The method for manufacturing a pneumatic tire according to claim 1, wherein said first layer has a thickness of 0.05 mm to 0.6 mm, and the second layer has a thickness of 0.01 mm to 0.3 mm.

5. The method for manufacturing a pneumatic tire according to claim 1, said strip being obtained by a manufacturing method including the steps of:
   (a) coextruding the first layer with the second layer;
   (b) passing the sheet through a pair of die rollers and transferring a shape of the die rollers on said sheet to form the strip having the ear portions on opposite of the main body; and
   (c) detaching said strip from the die rollers.

* * * * *